United States Patent
Imamura et al.

(10) Patent No.: US 8,980,493 B2
(45) Date of Patent: Mar. 17, 2015

(54) FUEL CELL COOLING SYSTEM

(75) Inventors: Atsushi Imamura, Kariya (JP); Akishi Morita, Aichi-ken (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 1329 days.

(21) Appl. No.: 12/480,801

(22) Filed: Jun. 9, 2009

(65) Prior Publication Data

US 2009/0317680 A1    Dec. 24, 2009

(30) Foreign Application Priority Data

Jun. 18, 2008    (JP) .................................. 2008-159190

(51) Int. Cl.
H01M 8/04    (2006.01)

(52) U.S. Cl.
CPC ...... *H01M 8/04029* (2013.01); *H01M 8/04044* (2013.01); *H01M 8/04358* (2013.01); *H01M 8/04417* (2013.01); *H01M 8/04768* (2013.01); Y02E 60/50 (2013.01)
USPC ........... 429/437; 429/433; 429/434; 429/435; 429/436; 429/438; 429/442

(58) Field of Classification Search
CPC ..................... H01M 8/04029; H01M 8/04044; H01M 8/04358; H01M 8/04723; Y02E 60/50
USPC .......... 429/435, 437, 442, 433, 434, 436, 438
See application file for complete search history.

(56) References Cited

U.S. PATENT DOCUMENTS

| | | | |
|---|---|---|---|
| 2002/0025466 A1* | 2/2002 | Mueller et al. | 429/26 |
| 2005/0115884 A1* | 6/2005 | Suzuki et al. | 210/282 |
| 2005/0189094 A1* | 9/2005 | Van Decker et al. | 165/140 |
| 2006/0269807 A1* | 11/2006 | Fujita et al. | 429/26 |
| 2007/0114005 A1 | 5/2007 | Bronold et al. | |

FOREIGN PATENT DOCUMENTS

| | | |
|---|---|---|
| JP | 2002-110205 | 4/2002 |
| JP | 2003-346848 | 12/2003 |
| JP | 2005-050731 | 2/2005 |
| JP | 2005-161117 | 6/2005 |
| JP | 2007-059186 | 3/2007 |
| JP | 2007-141848 | 6/2007 |
| JP | 2007-234477 | 9/2007 |

OTHER PUBLICATIONS

English language Abstract of JP 2005-161117, Jun. 23, 2005.
English language Abstract of JP 2007-234477, Sep. 13, 2007.
Japan Office action, mail date is Dec. 4, 2012, not in English.

* cited by examiner

*Primary Examiner* — Basia Ridley
*Assistant Examiner* — Heng Chan
(74) *Attorney, Agent, or Firm* — Greenblum & Bernstein, P.L.C.

(57) ABSTRACT

A circulation pipe for a coolant is connected to a fuel cell. A pump and a heat exchanger are connected to the circulation pipe. A bypass pipe is connected in parallel with the pump. An ion exchanger is connected to the bypass pipe. An electronic cooling device is connected to the bypass pipe on an upstream side of the ion exchanger. The coolant, which is supplied to the ion exchanger, is cooled by the electronic cooling device to a predetermined temperature, so that the ion-exchange resins are prevented from being abnormally heated by the coolant.

5 Claims, 3 Drawing Sheets

11. Fuel cell
12. Circulation pipe
13. Pump
14. Heat exchanger
15. Radiator
16. Fan
17. Bypass pipe
18. Ion exchanger
25. Electronic cooling device
31. Temperature sensor
32. Controller 11. Fuel cell
12. Circulation pipe
13. Pump
14. Heat exchanger
15. Radiator
16. Fan
17. Bypass pipe
18. Ion exchanger
25. Electronic cooling device
31. Temperature sensor
32. Controller

FUEL CELL COOLING SYSTEM

CROSS-REFERENCE TO RELATED APPLICATIONS

The present application claims priority under 35 U.S.C. §119 of Japanese Application No. 2008-159190 filed on Jun. 18, 2008, the disclosure of which is expressly incorporated by reference herein in its entirety.

BACKGROUND OF THE INVENTION

1. Field of the Invention

The present invention relates to a fuel cell cooling system, more specifically to a cooling system that performs cooling by absorbing heat by heat exchange, the heat being generated from power generation cells when a fuel cell generates power.

2. Description of Related Art

In a fuel cell system, when numerous power generation cells layered in the fuel cell generate power as hydrogen gas and oxygen gas react to each other, the power generation cells generate heat. Without heat dissipation, the power generation cells are overheated and unable to generate power. In order to cool the power generation cells when power is generated, a coolant cooling system is generally provided to the fuel cell. A cooling system is disclosed in Related Art 1 as a cooling system of the type. As shown in FIG. 7, a circulation pipe 12 is connected to a fuel cell 11 in the cooling system, the circulation pipe 12 circulating a coolant by a pump 13. A heat exchanger 14 is connected to the circulation pipe 12 on an upstream side of the pump 13. The heat exchanger 14 includes a radiator 15 and a fan 16, which blows air to the radiator 15.

LLC (long-life coolant), which contains ethylene glycol (antifreeze liquid) in water, is used as the coolant. When the pump 13 is driven to generate power, the coolant is supplied inside the fuel cell 11. Then, heat exchange occurs due to a temperature difference between heat generated from power generation cells and heat of the coolant, and thereby the power generation cells in the fuel cell 11 are cooled. In the process, the ethylene glycol contained in the coolant is thermolized, and thus a formic acid is produced, which then produces negative ions. Further, when the formic acid corrodes an internal surface of a circulation path of the coolant, positive ions are also produced. Thereby, the coolant includes impurity ions, which are a mixture of negative and positive ions. Since the ions are charged, the higher the concentration of the impurity ions is in the coolant, the higher the electric conductivity of the coolant is. Electricity generated by the fuel cell 11 thus leaks outside through the coolant as a medium.

In order to address the above described problems, a bypass pipe 17 is connected to the circulation pipe 12 in parallel with the pump 13 in Related Art 1. An ion exchanger 18 is connected to the bypass pipe 17, the ion exchanger 18 adsorbing and removing the impurity ions from the coolant. The ion exchanger 18 includes therein particulate anion exchange resins and particulate cation exchange resins as ion-exchange resins, the anion exchange resins adsorbing negative ions, the cation exchange resins adsorbing positive ions. The ion-exchange resins adsorb and remove the impurity ions, and thereby keeps the electric conductivity of the coolant from increasing.

[Related Art 1] Japanese Patent Laid-open Publication No. 2005-161117

However, the conventional cooling system described above has problems. Specifically, the coolant is used for cooling the power generation cells of the fuel cell 11, and thus heated due to heat exchange. Since the high-temperature coolant enters the ion exchanger 18, the ion-exchange resins are abnormally heated. It is thus required to use ion-exchange resins having a high heat resistant temperature. In addition, since it is required to take into account the heat resistant temperature of the ion-exchange resins, an operating temperature of the cooling system cannot be set high. Consequently, an allowable temperature range of the cooling system cannot be increased, and a selection range of the ion-exchange resins is limited. Further, the ion-exchange resins have problems not only of decline in the ion-exchange function, but also of heat degradation.

SUMMARY OF THE INVENTION

The present invention is provided to address the problems with the conventional technology above. The present invention provides a fuel cell cooling system capable of preventing abnormal heating of ion-exchange resins contained in an ion exchanger, and allowing a wide allowable temperature range of the cooling system and a wide selection of the ion-exchange resins. The fuel cell cooling system is also capable of appropriately maintaining an ion-exchange function, and preventing heat degradation of the ion-exchange resins.

In order to address the problems above, a first aspect of the present invention provides a fuel cell cooling system including a circulation pipe for a coolant connected to the fuel cell; a pump connected to the circulation pipe to circulate the coolant; a heat exchanger connected to the circulation pipe to cool the coolant therein; and an ion exchanger configured to adsorb and remove impurity ions included in the coolant in the circulation pipe. At least one of the ion exchanger and the circulation pipe on an upstream side of the ion exchanger is provided with a cooler configured to cool the coolant to a predetermined temperature or less.

A second aspect of the present invention provides the fuel cell cooling system according to the first aspect, wherein the cooler includes a cooling fin provided on an external peripheral surface of a container of the ion exchanger; and a fan configured to blow air to the cooling fin.

A third aspect of the present invention provides the fuel cell cooling system according to the second aspect, wherein the heat exchanger includes a radiator connected to the circulation pipe, and a cooling fan configured to supply air to the radiator; and wherein the cooling fan also functions as a cooling fan for the cooling fin.

A fourth aspect of the present invention provides the fuel cell cooling system according to the first aspect, wherein a bypass pipe is connected in parallel with the circulation pipe; the ion exchanger is connected to the bypass pipe; and the cooler is provided on one of the bypass pipe on the upstream side of the ion exchanger and the circulation pipe.

A fifth aspect of the present invention provides the fuel cell cooling system according to the fourth aspect, wherein one of a coil portion and a serpentine portion is provided to the bypass pipe on the upstream side of the ion exchanger; and one of the coil portion and the serpentine portion is configured to be cooled by the cooling fan.

In the present invention, the heated coolant having a high temperature after having been used for cooling the fuel cell, is cooled by the cooler before or after entering inside the ion exchanger, and then the coolant has a low temperature. Since an operating temperature of the ion-exchange resins is lowed, ion-exchange resins having a low heat resistant temperature can be used. In addition, even when the operating temperature is set high for the cooling system as a whole, the ion-exchange resins are cooled by the cooler to a predetermined temperature, and thus a maximum value of a heat resistant temperature of the ion-exchange resins can be set high. Moreover, an allowable temperature range of the cooling system can be increased, and a selection range of the ion-exchange resins can be increased. Furthermore, the ion-exchange resins are not abnormally heated by the coolant. Thus, the function of the ion-exchange resins is maintained appropriately and heat deterioration of the ion-exchange resins is prevented.

The present invention prevents abnormal heating of the ion-exchange resins contained in the ion exchanger. Thereby, the allowable temperature range of the cooling system can be increased, and the selection range of the ion-exchange resins can be increased. Concurrently, the function of the ion-exchange resins is maintained appropriately and heat deterioration of the ion-exchange resins is prevented.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF PREFERRED EMBODIMENTS

Figure 1:
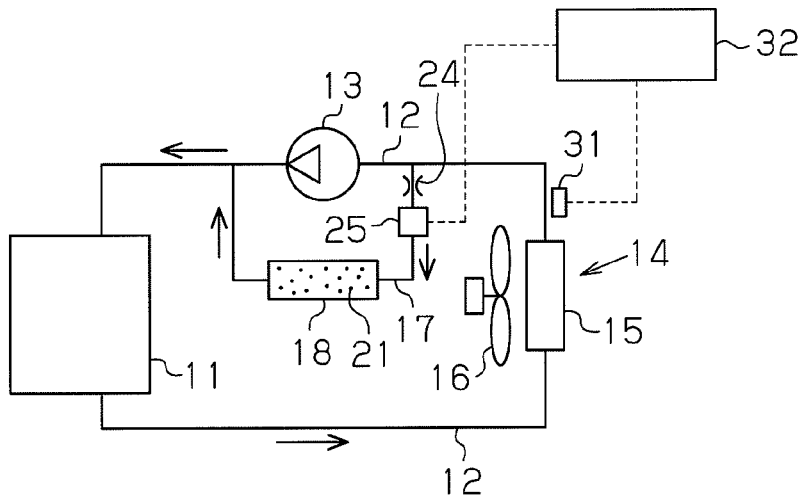
FIG. 1 is a schematic circuit diagram of a fuel cell cooling system according to a first embodiment of the present invention.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

An embodiment, in which the present invention is embodied as a cooling system of a fuel cell for an electric vehicle, is explained below with reference to FIGS. 1 to 3. A fuel cell 11 is internally provided with a fuel pole, an oxidant pole, and numerous layered power generation cells, which are composed of solid electrolyte membranes and provided between the poles (none of the components are shown in the drawing). On the fuel pole side, a hydrogen gas supplier is connected to supply hydrogen gas as a fuel. On the oxidant pole side, an air supplier is connected to supply air including oxygen gas as an oxidant. Then, the hydrogen gas and the oxygen gas supplied in each of the power generation cells in the fuel cell 11 react to each other and thus generate power.

A circulation pipe 12 is connected to the fuel cell 11 in order to circulate a coolant that cools the power generation cells of the fuel cell 11, when power is being generated. A pump 13 is connected to the circulation pipe 12. In the present embodiment, LLC (long-life coolant), which contains ethylene glycol in water, is used as the coolant. A heat exchanger 14 is connected to the circulation pipe 12 on an upstream side of the pump 13, the heat exchanger 14 being used to cool the power generation cells in the fuel cell 11 by cooling the high-temperature coolant heated by heat exchange. The heat exchanger 14 includes a radiator 15 and a fan 16, the radiator 15 being connected to the circulation pipe 12, the fan 16 being driven by an electric motor to cool the high-temperature coolant by blowing air to the radiator 15.

When the pump 13 is driven, the coolant is supplied to the power generation cells in the fuel cell 11. When the fuel cell 11 is cooled, the ethylene glycol contained in the coolant is thermolized, as described in the Related Art. Eventually, impurity ions, which are a mixture of negative and positive ions, are produced in the coolant. Since the impurity ions are charged, the ions increase the electric conductivity of the coolant. Thus, electricity generated in the fuel cell 11 might leak outside through the coolant. In order to prevent the leak, a bypass pipe 17 is connected to the circulation pipe 12 in parallel with the pump 13. An ion exchanger 18 is connected to the bypass pipe 17, the ion exchanger 18 adsorbing and removing the impurity ions in the coolant.

Figure 2:
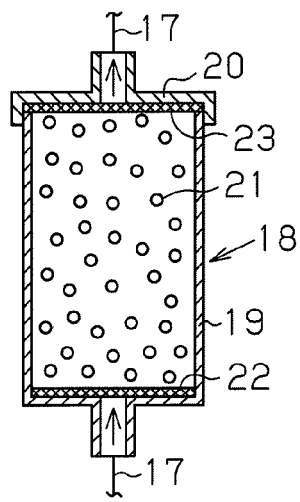
FIG. 2 is a vertical cross-sectional view of an ion exchanger.
Figure 3:
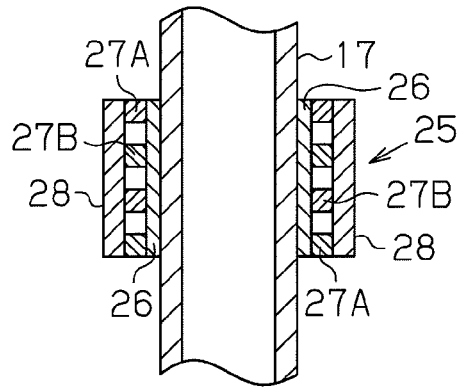
FIG. 3 is a vertical cross-sectional view of an electronic cooling device mounted on a pipe.

The ion exchanger 18 includes a container main body 19, a lid plate 20, and ion-exchange resins 21, as shown in FIG. 2. The container main body 19 has a cylindrical shape with a bottom. The lid plate 20 is detachably screwed into an upper opening of the container main body 19. The ion-exchange resins 21 are provided in a particle shape and contained in the container main body 19. Filters 22 and 23 having a mesh size smaller than a particle size of the ion-exchange resins 21, are housed at bottom and top upper portions of the container main body 19. Thereby, the ion-exchange resins 21 do not leak outside from the container main body 19. Anion exchange resins adsorbing negative ions and cation exchange resins adsorbing positive ions are mixed and contained as the ion-exchange resins 21.

An aperture 24 is connected to the bypass pipe 17 on the upstream side of the ion-exchanger 18. The aperture 24 regulates a flow rate per unit hour of the coolant directed from the circulating pipe 12 to the ion exchanger 18, to a predetermined rate (for instance, 5%) with respect to a flow rate of the coolant flowing in the circulation pipe 12.

On an external peripheral surface of the bypass pipe 17 on the upstream side of the ion exchanger 18, an electronic cooling device 25 is mounted as a cooler, which cools the high-temperature coolant (70° C. to 80° C.) before flowing in the ion exchanger 18 to a predetermined temperature (for example, 20° C. to 40° C.). The electronic cooling device 25 includes, as shown in FIG. 3, a cooling plate 26, an N-type semiconductor 27A and a P-type semiconductor 27B, and a heat dissipating plate 28. The cooling plate 26 is mounted on the external peripheral surface of the bypass pipe 17 and provided in a cylindrical shape. The N-type semiconductor 27A and the P-type semiconductor 27B are bonded to an external peripheral surface of the cooling plate 26. The heat dissipating plate 28 is bonded to an external peripheral surface of the N-type semiconductor 27A and the P-type semiconductor 27B. When a direct current flows in the N-type semiconductor 27A and the P-type semiconductor 27B, a thermoelectric conversion phenomenon (Peltier effect)

occurs at each of the bonded portions. Thereby, the cooling plate 26 is cooled, and thus the coolant in the bypass pipe 17 is cooled.

A temperature sensor 31 is provided to the circulation pipe 12 on a downstream side of the heat exchanger 14, the temperature sensor 31 measuring the temperature of the coolant. Measured value data of the temperature measured by the temperature sensor 31 is transferred to a controller 32 provided with a computer. When the controller 32 determines that the measured value of the temperature exceeds a set value, the controller 32 outputs an operation signal to the electronic cooling device 25, and thus the coolant in the bypass pipe 17 is cooled. The measured value is also used to control a rotation rate of the fan 16.

Operations are explained below, of the cooling system for the fuel cell 11 having the structure above. When the fuel cell 11 is activated by a start signal and a variety of control signals from the controller 32, hydrogen gas and oxygen gas supplied in the fuel cell 11 react to each other, and thus generate power. The generated direct current is converted to an alternating current by an inverter. The converted alternating current is used for driving a motor to drive an electric vehicle.

Meanwhile, when the pump 13 of the cooling system is activated, the coolant in the circulation pipe 12 is circulated in a direction of an arrow of FIG. 1. The coolant cooled by the heat exchanger 14 is supplied into the fuel cell 11. The coolant then absorbs heat generated when the fuel cell 11 generates power, and thus cools the fuel cell 11. The coolant, which has absorbed the heat and thus has a high temperature, is cooled again by the heat exchanger 14, and reused for cooling the fuel cell 11.

The coolant in the circulation pipe 12 is heated by the heat generated by the power generation cells in the fuel cell 11. Thus, ethylene glycol contained in the coolant is thermolized, and then impurity ions are produced. A portion of the coolant containing the impurity ions flows from the bypass pipe 17 and the aperture 24 to a lower inlet of the ion exchanger 18, and then into the container main body 19, as shown in FIG. 2. The coolant moves upward and is directed from an upper outlet to the circulation pipe 12 through the bypass pipe 17. The ion-exchange resins 21 (anion exchange resins and cation exchange resins) in the ion exchanger 18 adsorb and remove the negative and positive impurity ions.

Meanwhile, the controller 32 determines a measured value of the coolant temperature measured by the temperature sensor 31. When determining that the measured value exceeds a set value, the controller 32 outputs a start signal to a drive circuit of the electronic cooling device 25. Then, the coolant is cooled by the electronic cooling device 25 to a predetermined temperature (for example, 20° C. to 40° C.). The cooled coolant is then supplied to the ion exchanger 18. Thereby, the high-temperature coolant is not supplied to the ion-exchange resins 21 in the ion exchanger 18, and thus the function of the ion-exchange resins 21 is maintained appropriately and heat deterioration of the ion-exchange resins 21 is prevented.

The fuel cell cooling system according to the embodiment above can provide effects below.

(1) Since the electronic cooling device 25 is provided to the bypass pipe 17 on the upstream side of the ion exchanger 18 in the embodiment above, the coolant can be cooled to the predetermined temperature (for example, 20° C. to 40° C.) before being supplied to the ion exchanger 18. Thereby, the operating temperature of the ion-exchange resins 21 can be low, and thus the ion-exchange resins 21, which have a low heat resistant temperature, can be used. In addition, even when the operating temperature is set high (for example, 100° C.) for the cooling system as a whole, the ion-exchange resins 21 are cooled by the electronic cooling device 25 to a predetermined temperature (for example, 70° C. to 80° C.), and thus a maximum value of the heat resistant temperature of the ion-exchange resins 21 can be set high (for example, 70° C. to 80° C.). Consequently, an allowable temperature range can be increased, and a selection range of the ion-exchange resins 21 can be increased.

(2) Since the coolant can be cooled to the predetermined temperature (for example, 20° C. to 40° C.) before being supplied to the ion exchanger 18 in the embodiment above, the high-temperature coolant (70° C. to 80° C.) is not supplied to the ion-exchange resins 21 in the ion exchanger 18. Thereby, the function of the ion-exchange resins 21 is maintained appropriately, and heat deterioration of the ion-exchange resins 21 is prevented.

(3) In the embodiment above, the temperature sensor 31 measures the coolant temperature on the outlet side of the heat exchanger 14. When the measured value exceeds the set value, the electronic cooling device 25 is activated. Thereby, the electronic cooling device 25 can be prevented from operating when not required, and thus the running cost can be reduced.

(4) In the embodiment above, the bypass pipe 17 is connected in parallel with the circulation pipe 12, and the ion exchanger 18 is connected to the bypass pipe 17. A portion of the coolant is thus directed to the ion exchanger 18. Thereby, the flow of the most coolant in the circulation pipe 12 is not disturbed by the ion-exchange resins 21, and thus the load of the pump 13 can be reduced.

Figure 4:
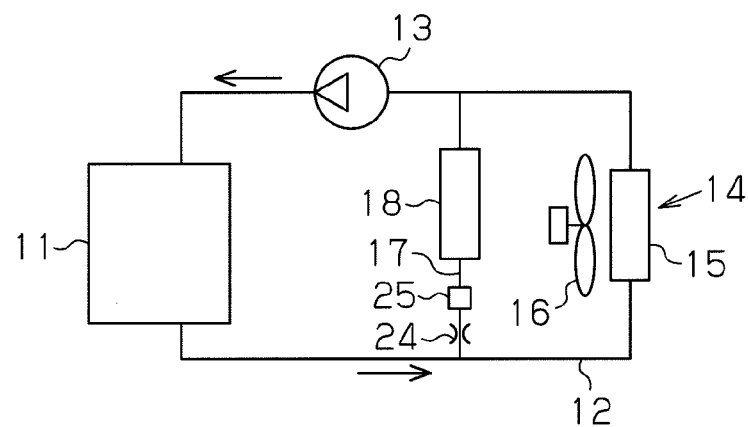
FIG. 4 is a circuit diagram of a fuel cell cooling system according to another embodiment of the present invention.

The present embodiment can be modified as described below. As shown in FIG. 4, the bypass pipe 17 may be connected in parallel with the heat exchanger 14, and the electronic cooling device 25 may be connected to the bypass pipe 17 on the upstream side of the ion exchanger 18 or the circulation pipe 12.

Figure 5:
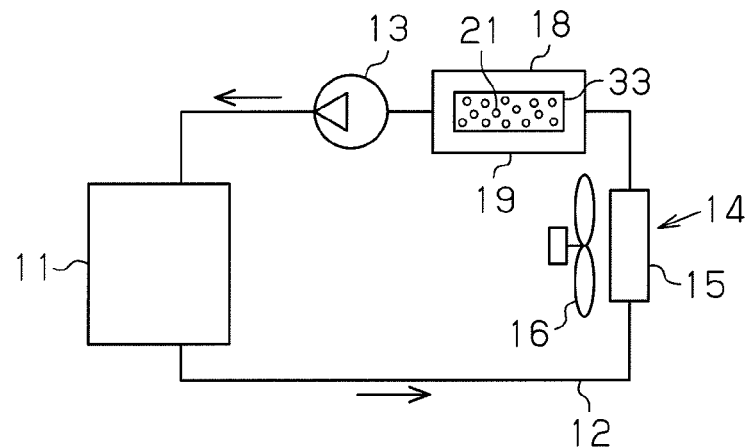
FIG. 5 is a circuit diagram of a fuel cell cooling system according to another embodiment of the present invention.

As shown in FIG. 5, the bypass pipe 17 may be eliminated, and the ion exchanger 18 may be connected in series to the circulation pipe 12, in order to configure the cooling system. In the present embodiment, the ion-exchange resins 21 are contained in a mesh container 33, and a main coolant path is provided between an external peripheral surface of the container 33 and an internal peripheral surface of the container main body of the ion exchanger 18, in order to reduce the flow resistance of the ion exchanger 18.

Figure 6:
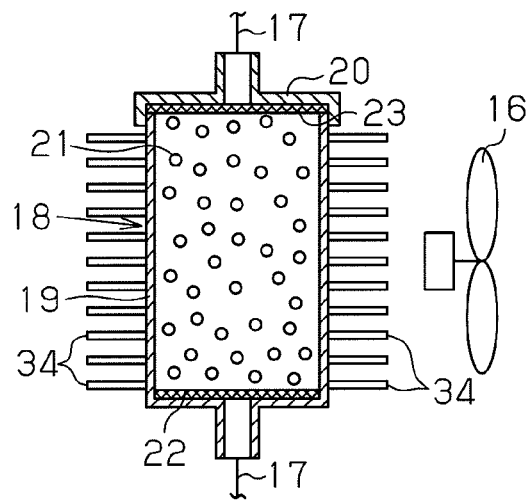
FIG. 6 is a vertical cross-sectional view of an ion exchanger and a cooler according to another embodiment of the present invention.
Figure 7:
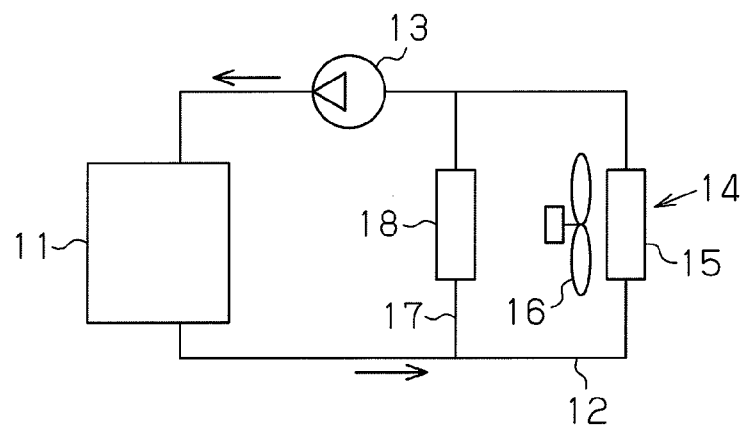
FIG. 7 is a schematic circuit diagram of a conventional fuel cell cooling system.

As shown in FIG. 6, cooling fins 34 may be attached at a plurality of positions on the external peripheral surface of the container main body 19 of the ion exchanger 18, and the fan 16 of the heat exchanger 14 may cool the cooling fins 34, so as to cool the coolant in the container main body 19. In the present embodiment, eliminating an exclusive driving source for cooling the coolant entering the ion exchanger 18 can reduce the running cost.

The electronic cooling device 25 may be provided on the internal peripheral surface of the container main body 19 of the ion exchanger 18 (not shown in the drawing). Further, a cooling device other than the Peltier device may be used as the electronic cooling device 25. Alternatively, a different cooler may be employed.

A coil portion or a serpentine portion may be provided to the pipe 17 on the upstream of the ion exchanger 18, and the coil portion or the serpentine portion may be cooled by a cooling fan. In this case, it is preferable to use the fan 16 of the heat exchanger 14 in view of reducing the number of parts.

The present invention is embodied in the fuel cell system for an electric vehicle in the embodiments above. It may be also embodied in a cooling system for a fuel cell system for power generation used at production plants or general households.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A fuel cell cooling system, comprising:
    a circulation pipe connected to a fuel cell to circulate a coolant;
    a pump connected to the circulation pipe to circulate the coolant;
    a heat exchanger connected to the circulation pipe to cool the coolant;
    an ion exchanger configured to adsorb and remove impurity ions from the coolant in the circulation pipe;
    a temperature sensor configured to monitor a temperature of the coolant at a downstream side of the heat exchanger; and
    a controller programmed to operate a cooler that is provided on at least one of the ion exchanger and the circulation pipe on an upstream side of the ion exchanger and is configured to cool the coolant to no more than a predetermined temperature when the temperature of the coolant at the downstream side of the heat exchanger exceeds the predetermined temperature.

2. The fuel cell cooling system according to claim 1, wherein the heat exchanger comprises:
    a radiator connected to the circulation pipe; and
    a cooling fan configured to supply air to cool the radiator, wherein
    the cooling fan is configured to supply air to cool the cooler.

3. The fuel cell cooling system according to claim 1, wherein a bypass pipe is connected in parallel with the circulation pipe; the ion exchanger is connected to the bypass pipe; and the cooler is provided on one of the bypass pipe on the upstream side of the ion exchanger and the circulation pipe on the upstream side of the ion exchanger.

4. The fuel cell cooling system according to claim 3, wherein one of a coil portion and a serpentine portion is provided to the bypass pipe on the upstream side of the ion exchanger; and one of the coil portion and the serpentine portion is configured to be cooled by a cooling fan.

5. The fuel cell cooling system according to claim 3, wherein the cooler comprises:
    a cooling plate;
    an N-type semiconductor and a P-type semiconductor; and
    a heat dissipating plate, wherein
    the cooling plate is mounted on the external peripheral surface of the bypass pipe and provided in a cylindrical shape,
    the N-type semiconductor and the P-type semiconductor are bonded to an external peripheral surface of the cooling plate, and
    the heat dissipating plate is bonded to an external peripheral surface of the N-type semiconductor and the P-type semiconductor, such that when a direct current flows in the N-type semiconductor and the P-type semiconductor, a thermoelectric conversion phenomenon occurs at each of the bonded portions thereby cooling the cooling plate and the coolant.

* * * * *